(12) United States Patent
Suvakovic (10) Patent No.: US 8,630,548 B2
(45) Date of Patent: Jan. 14, 2014

(54) METHOD AND APPARATUS FOR IMPROVED UPSTREAM FRAME SYNCHRONIZATION IN A PASSIVE OPTICAL NETWORK

(75) Inventor: Dusan Suvakovic, Pleasanton, CA (US)

(73) Assignee: Alcatel Lucent, Paris (FR)

( * ) Notice: Subject to any disclaimer, the term of this patent is extended or adjusted under 35 U.S.C. 154(b) by 741 days.

(21) Appl. No.: 12/482,435

(22) Filed: Jun. 10, 2009

(65) Prior Publication Data

US 2010/0316379 A1    Dec. 16, 2010

(51) Int. Cl.
*H04B 10/00* (2013.01)

(52) U.S. Cl.
USPC .......................................... 398/167; 398/168

(58) Field of Classification Search
USPC .......................................... 398/99, 167–168
See application file for complete search history.

(56) References Cited

U.S. PATENT DOCUMENTS

| 2002/0171895 A1 | 11/2002 | Chang |
| 2004/0141759 A1 | 7/2004 | Stiscia |
| 2008/0089686 A1 | 4/2008 | Kazawa |
| 2009/0123159 A1* | 5/2009 | Leung et al. .................. 398/154 |
| 2009/0202242 A1* | 8/2009 | Niibe et al. ..................... 398/63 |

FOREIGN PATENT DOCUMENTS

EP    1231813 A2    8/2002

* cited by examiner

*Primary Examiner* — Danny Leung
(74) *Attorney, Agent, or Firm* — RGIP LLC (57) ABSTRACT

In a passive optical network, upstream transmission frames from an ONU to an OLT can include additional delimiters that assist in overcoming high signal distortion at the beginning of the frame that can obscure an initial frame delimiter. The second delimiter can be inserted into the frame at various locations within the frame known to the OLT such that the OLT can active a delimiter detector at the beginning of a timing window for delimiter detection. The ONU can assist the OLT in synchronizing the frame by ensuring that a frame header immediately follows a second delimiter or appears at the start of a first FEC code block following the second delimiter. Depending on where the ONU inserts the second delimiter in the frame generation process, the second delimiter may be scrambled and/or may form part of the FEC.

8 Claims, 15 Drawing Sheets

METHOD AND APPARATUS FOR IMPROVED UPSTREAM FRAME SYNCHRONIZATION IN A PASSIVE OPTICAL NETWORK

FIELD OF THE INVENTION

This disclosure relates to a Passive Optical Network (PON) and to systems and methods for improving communications in a PON.

BACKGROUND OF THE INVENTION

A passive optical network (PON) is a flexible access network that is capable of providing a range of broadband and narrow-band services for business and residential customers. The underlying equipment is considered to be relatively inexpensive for network operators because they do not require any active equipment or power supplies between the operator's central office (CO) and customer's premises (CP). As shown in the PON 10 of FIG. 1, downstream PON traffic is destined from the Optical Line Termination (OLT) 12 residing in the CO towards a number of Optical Network Terminals (ONTs) 16 (or Optical Network Units (ONUs), not shown), residing in the CPs via an optical splitter 14.

Figure 1:
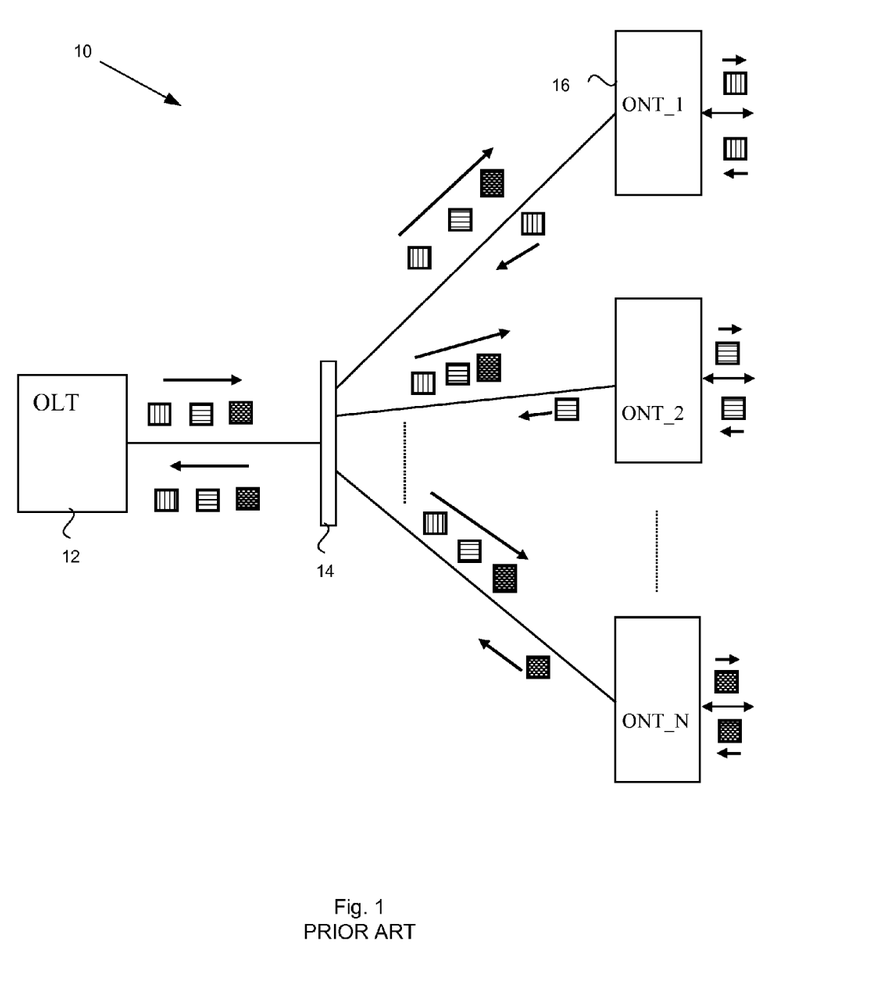
FIG. 1 illustrates time-multiplexed traffic on the PON.

Since the OLT 12 is the only unit transmitting in the downstream direction, there can be no collision between downstream-bound packets. Upstream PON traffic shares the same optical fiber with the downstream traffic, utilizing a different wavelength. Therefore, there cannot be any collision between downstream and upstream packets either. However, since the upstream traffic originates from all ONUs 16, and all ONUs are transmitting on the same wavelength, packet collision can occur if two or more ONUs 16 are transmitting simultaneously. In order to prevent collisions, upstream PON traffic is managed in the Time Division Multiple Access (TDMA) fashion. One of the functions of the OLT 12 is to schedule and grant separate time slots to each ONU 16, thus avoiding collision between upstream packets. Transmitter lasers of each ONU 16 can be turned on only during their respective transmission time slots.

The OLT 12 must be capable of receiving bursts of data from different ONUs. A typical burst-mode receiver consists of a photo detector (PD), transimpedance amplifier (TIA), limiting amplifier (LA) and clock and data recovery (CDR) circuitry. The PD performs conversion of the received optical signal into an electrical signal. TIA and LA restore the latter to a standard digital voltage level, whereas the CDR recovers the clock and extracts the transmitted data contents from the LA output signal.

The evolution of PON systems and their underlying standards has seen a steady increase in PON bit rate ranging from the initial 155 Mb/s in APON in the mid-1990s, to 1.25 Gb/s in Gigabit-capable PON (GPON) [ITU-T G.984] and Ethernet PON (EPON) [IEEE 802.3ah] of mid-2000s, up to 10 Gb/s specified in the IEEE 802.3av (10GEPON) [1-3] and ITU-T 10G GPON standards that are currently being drafted. The high bit rates pose an increasing challenge for implementation of the burst-mode receiver, particularly of its analog circuits. It can be difficult to design the TIA and LA that can restore the received signal fast enough and without distortion of its duty cycle, while supporting a wide dynamic range of the input signal. As a result of higher signal distortion at the beginning of upstream frames, the probability of bit errors is typically higher than for other parts of upstream frames. This issue is exacerbated at higher bit rates at which other causes of bit errors, like optical dispersion, are more pronounced.

The frame delimiter is the most significant field of the upstream frame, because the reception of the whole frame depends on the receiver's successful detection of the delimiter. The fact that the delimiter is located at the very beginning of the frame where signal distortion is most likely and that, unlike all other parts of the frame, it is not protected by forward error correction (FEC) error-control code, make the issue of its detection even more critical. In a typical GPON deployment, the overall subscriber packet loss in the upstream traffic is dominated by the loss of frame reception due to failed delimiter detection, for example where the delimiter is too short, or where a detection algorithm either does not accept delimiters with errors or can only handle a limited number of errors. The emerging PON standards such as XGPON [FSAN] and 10G EPON (IEEE 802.3av) are expected to show the same sensitivity related to delimiter detection.

Current solutions for delimiter detection centre around higher tolerance to bit errors. This solution is inadequate because it is not immune to longer bursts of bit errors and because it can lead to false delimiter detection.

What is required is an improved system and method for delimiter detection in a passive optical network.

SUMMARY OF THE INVENTION

In one aspect of the disclosure, there is provided a method for upstream transmission processing in a passive optical network. The method comprises generating a delimiter scheme that indicates one or more parameters of a second delimiter of an upstream transmission frame, communicating the delimiter scheme to at least one optical network unit, receiving a frame from the at least one optical network unit, and processing the frame to detect the at least one second delimiter in the frame.

In one aspect of the disclosure, there is provided an optical network unit of a passive optical network configured to generate a frame and transmit the frame to an optical line termination device. The frame comprises a first delimiter, at least one frame header, at least one frame payload, and at least one second delimiter.

In one aspect of the disclosure, there is provided an optical line termination device of a passive optical network configured to receive a frame from at least one optical network unit, process the frame to detect a first delimiter in the frame, and process the frame to detect at least one second delimiter in the frame.

BRIEF DESCRIPTION OF THE DRAWINGS

Reference will now be made, by way of example only, to specific embodiments and to the accompanying drawings in which.

DETAILED DESCRIPTION OF THE INVENTION

Figure 2A:
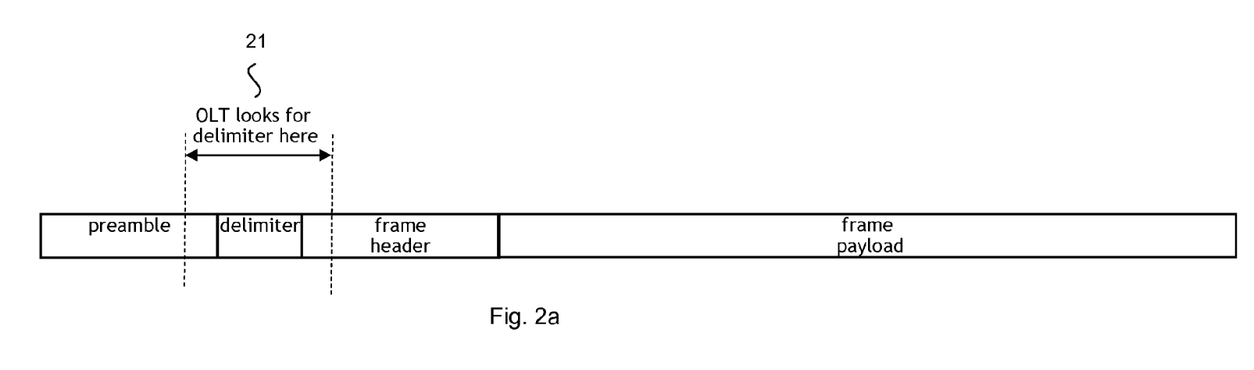
FIG. 2 illustrates a delimiter detection window
Figure 2B:
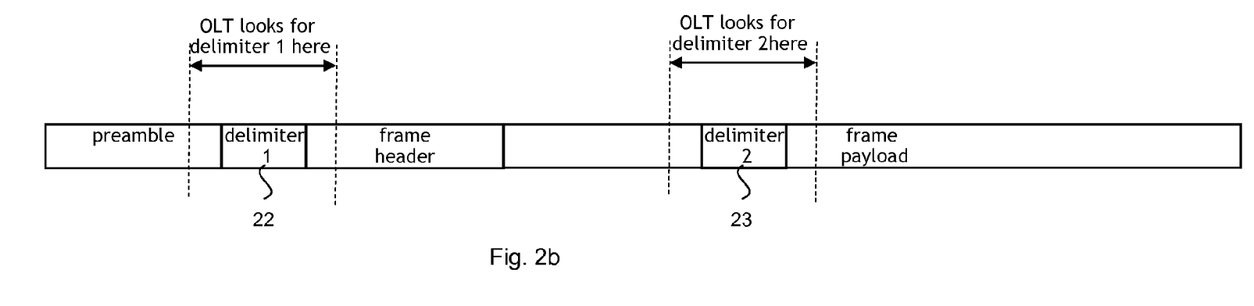

As shown in FIG. 1, PON upstream traffic originating from different ONUs 16 arrives at the OLT 12 in frames separated from each other in time. This separation is a result of scheduling and upstream bandwidth allocation performed by the OLT 12 and communicated to all ONUs 16. For well-designed ONUs 16 and OLTs 12, the worst-case difference between the expected and the actual arrival time of an upstream frame at the OLT is very small and typically does not exceed 1-2 byte periods. This feature allows the OLT 12 to look for the delimiter sequence only in a narrow time window 21, as illustrated in FIG. 2a. This feature is used in the present embodiments to detect additional delimiter sequences inserted at other known positions in the frame, with the same time resolution and without a risk of mistaking a payload bit sequence for the delimiter. Detection of multiple delimiters 22, 23 is illustrated in FIG. 2b.

Figure 14:
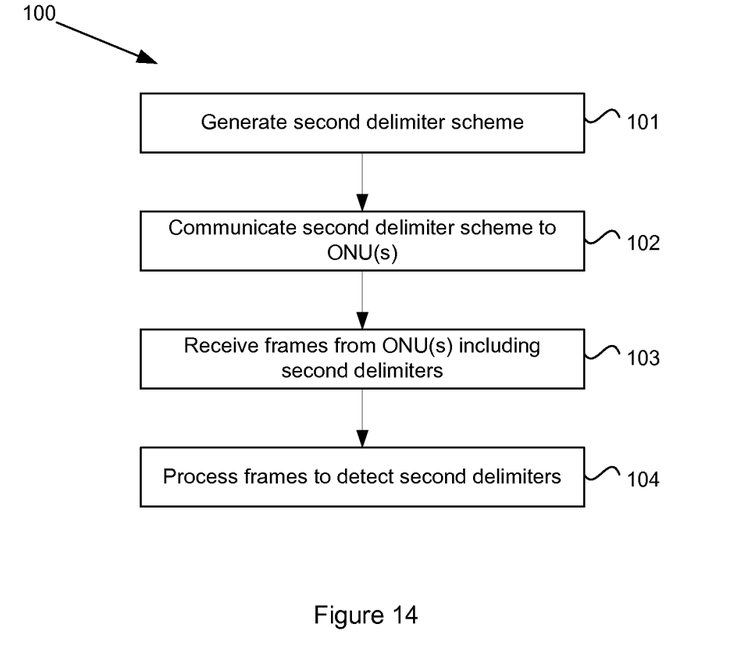
FIG. 14 illustrates a method for performing upstream frame transmissions on the PON.

A method for providing upstream communications in the PON 10 of FIG. 1 is shown in the flowchart 100 of FIG. 14. At step 101, a delimiter scheme is generated that indicates one or more parameters of a second delimiter for an upstream transmission frame. The delimiter scheme is communicated to the at least one ONU 16 at step 102 which then transmits frames including second delimiters as specified in the delimiter scheme. The OLT 12 receives such frames (step 103) and processes them to detect any second delimiters in the frame (step 104).

In one embodiment, the OLT 12 sends an individual Physical Layer Operation And Maintenance (PLOAM) or OMCI (OAM message formats in the ITU-T family of PON standards) control message to each ONU 16, or one broadcast PLOAM or OMCI message to all ONUs simultaneously, to specify parameters of the second delimiter scheme such as the number, location, binary patterns and sequence length of each individual delimiter required to be embedded in each upstream frame, sent by the respective ONUs. The described method reduces the probability of loss of the complete upstream frame. For example, if the OLT 12 fails to detect the first delimiter sequence in the upstream frame, but detects the second one, then only the payload (or frame header) data sent between the first and second delimiter will be lost. Alternatively, the payload can be buffered and processed after the synchronization of the frame. That is, synchronization can occur from any delimiter in the frame, allowing the complete frame to be processed.

In one embodiment, the PLOAM or OMCI message, or a separate unicast or broadcast (PLOAM or OMCI) message from the OLT 12 may additionally specify to each ONU 16, the offset from the beginning of the frame at which to send the upstream frame header. This method minimizes the probability of loss or wrong reception of the header in two ways. First, it delays the transmission of the header until after the initial distortion of the upstream signal at the receiver is reduced. Such distortion is common in PONs and results from a slow response of the receiver electronic circuitry. Second, this method allows multiple transmissions of the critical information contained in the header.

Embodiments of the disclosure are considered to include the method and ONU apparatus for insertion of programmable multiple delimiters in the upstream frame as well as the method and apparatus for OLT synchronization to such frames.

Figure 3:
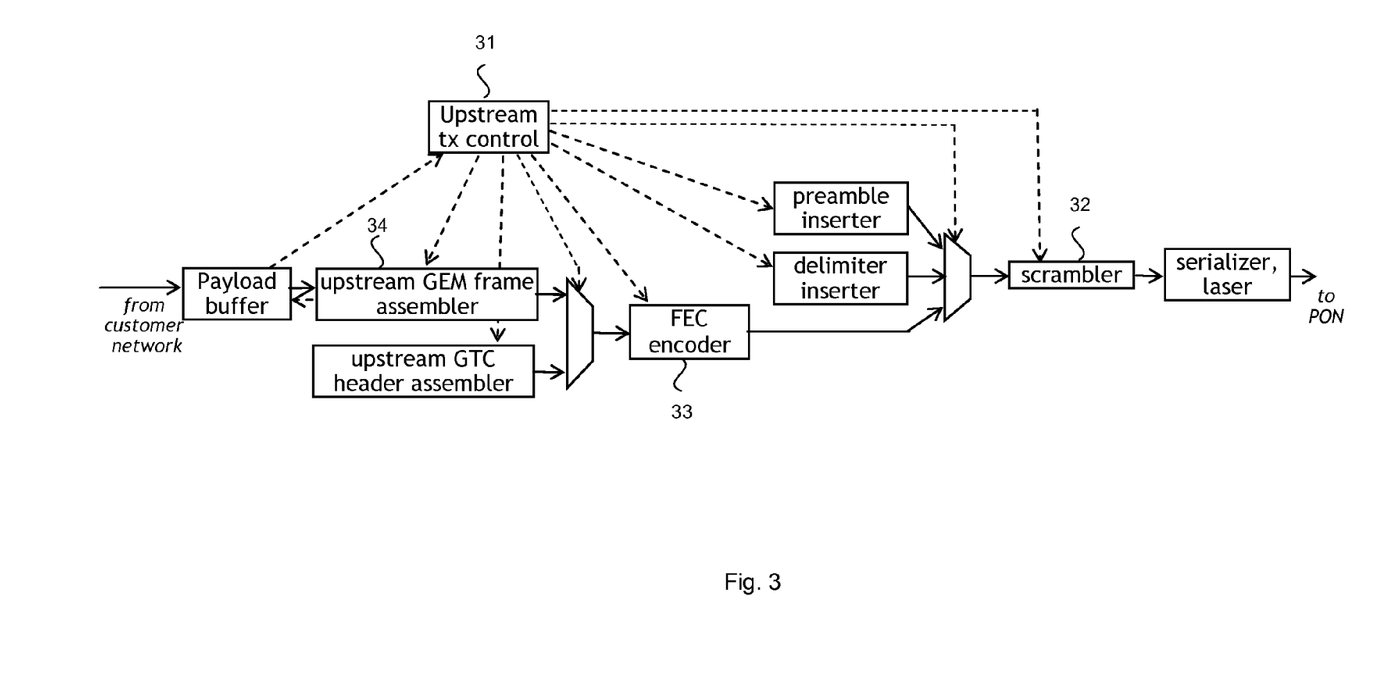
FIG. 3 illustrates a typical architecture for GPON ONU upstream path.
Figure 4:
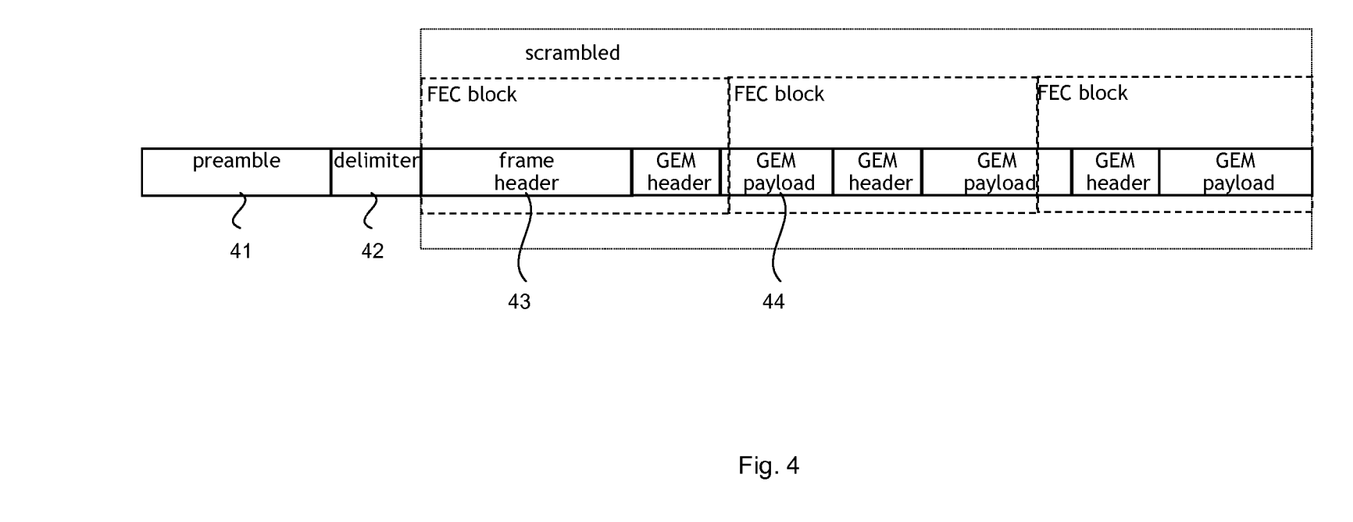
FIG. 4 illustrates an upstream frame structure.

A typical architecture of the GPON ONU upstream path (transmitter) is shown in FIG. 3. At the beginning of upstream transmission, the upstream control unit 31 keeps the scrambler 32 disabled, such that the preamble 41, followed by the delimiter 42, is transmitted unscrambled, as shown in FIG. 4. Upon the completion of the delimiter transmission, the control unit 31 enables the scrambler 32 and FEC encoder 33 starts transmitting the upstream GTC frame header 43. Once the whole header 43 is transmitted, the transmission of GEM (payload) frames 44 starts. The FEC encoder 33 and the scrambler 32 remain active until the end of the upstream frame transmission.

Figure 5:
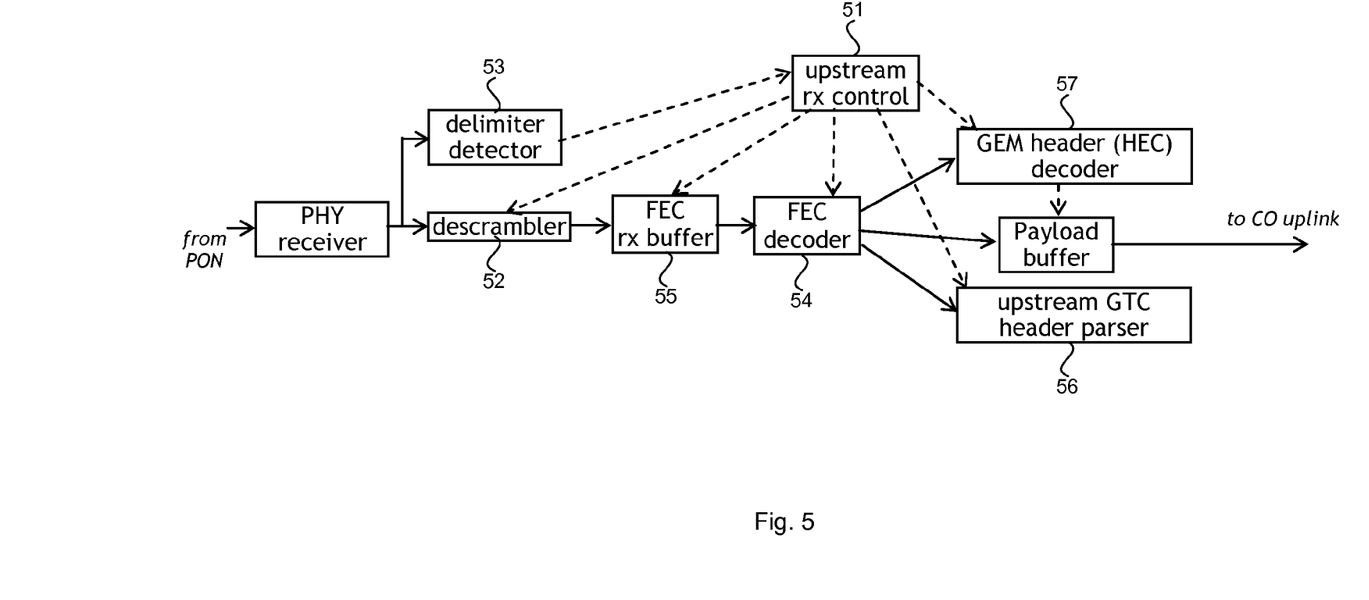
FIG. 5 illustrates a typical architecture for GPON OLT upstream path.

A typical architecture of the GPON OLT upstream path (receiver) is shown in FIG. 5. This architecture is fully compatible with the ONU transmitter in FIG. 3 and capable of receiving the upstream frame shown in FIG. 4. It operates as follows. Before the upstream frame reception starts, the receiver control unit 51 keeps the descrambler 52 de-activated, i.e., not passing the receiver signal. The control unit 51 turns on the delimiter detector 53 at the beginning of the time window for delimiter detection, as indicated in FIG. 2. Immediately after the delimiter detection, the descrambler 52 is activated and the received data is passed to the FEC decoder 54, through the receiver FEC buffer 55. The error-corrected frame data is further passed to the GTC header parser 56 and GEM header decoder 57 for content processing.

In alternative embodiments, the delimiter can be scrambled such that the OLT can look for a scrambled delimiter sequence rather than an unscrambled delimiter sequence. This removes the need to activate and de-active the scrambler of the ONU and the de-scrambler of the OLT as described above.

Figure 6:
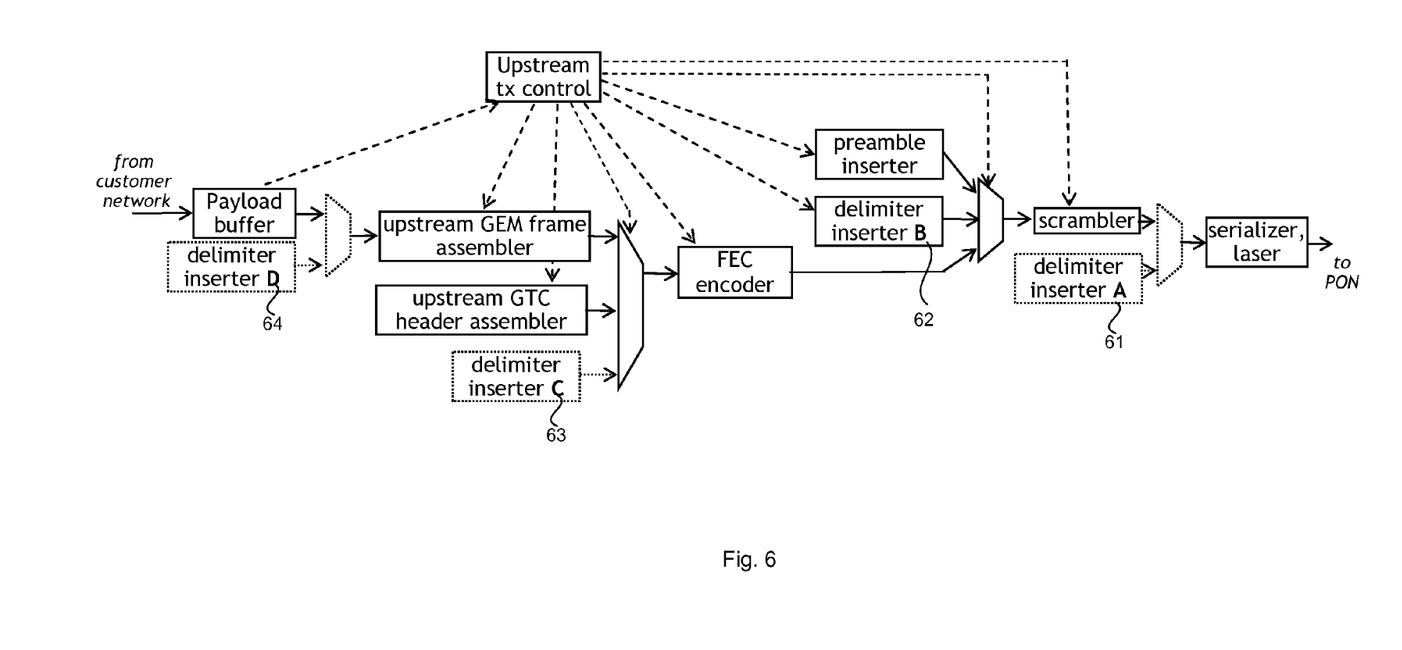
FIG. 6 illustrates example insertion points for additional delimiters.

FIG. 6 shows examples of possible insertion points 61, 62, 63, 64 for additional delimiters, in the ONU upstream path. The choice of the insertion point impacts the structure of the upstream frame (as illustrated in FIGS. 7 and 8) and the frame reception flow in the OLT. The hardware architecture of the OLT upstream receiver is the same in all these cases and illustrated in FIG. 9. In particular, the OLT of FIG. 9 includes a multi-delimiter reception controller 59 that determines when an initial delimiter of a frame has been detected, which may be the original frame delimiter or, if the original delimiter was missed, the first of any second delimiters to be successfully detected. The multi-delimiter reception controller 59 also determines when additional delimiters have been detected for the frame so that the additional delimiters can be processed appropriately. However, the operation of the control logic in the OLT receiver varies depending on the insertion point chosen. In addition, one can also determine the most likely location of a delimiter within the search window (with possibly weighted coefficients to give the middle of the search window a higher probability). Then, one can decode the header and see whether it is decodable. One can also look, in addition to the delimiter sequence, to known positions in the header, and use part of the preamble preceding the delimiter. This way, false sync detection can be reduced significantly.

Additionally, embodiments of the disclosure introduce conventions for FEC and GEM frame synchronization based on the reception of an additional delimiter, which are summarized below. A person skilled in the art will recognize that there may be a number of other possible synchronization conventions.

Convention 1. If upstream FEC is used, the OLT shall start receiving the frame starting from the beginning of the first FEC block following the detected delimiter. The offset of the start of the next FEC block from the detected delimiter should be known to the OLT based on the known position of the delimiter in the frame and known size of the FEC block. The ONU may ensure that the beginning of the first full GEM frame in the said next FEC block is aligned with the beginning of the FEC block. This way, the delimiter detection shall automatically ensure the GEM frame synchronization of the OLT receiver. The FEC and GEM alignment specified by this convention is illustrated in FIG. 7a-d, for upstream frames obtained by delimiter insertion and points A, B, C, D, respectively.

Figure 8A:
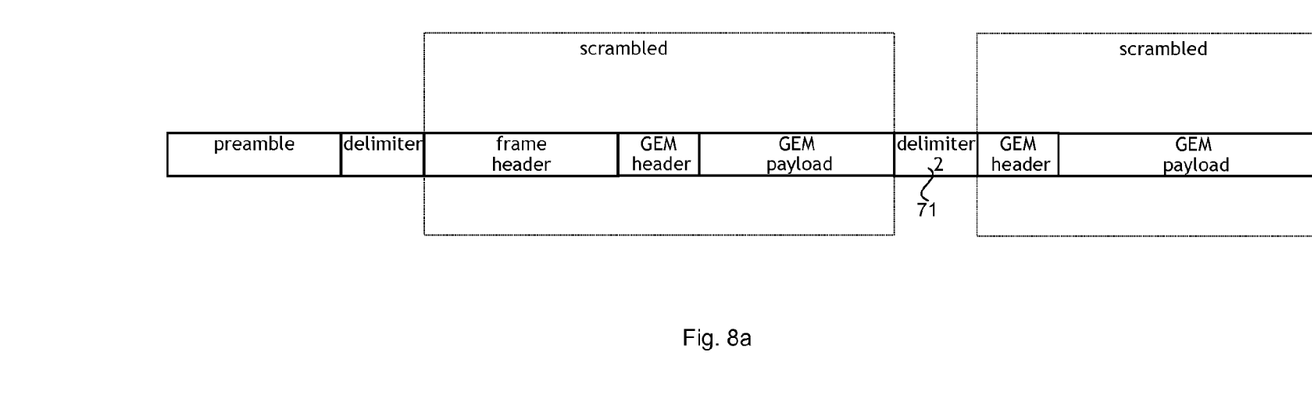
FIG. 8 illustrates a modified upstream frame structure with second delimiter, without FEC.
Figure 8B:
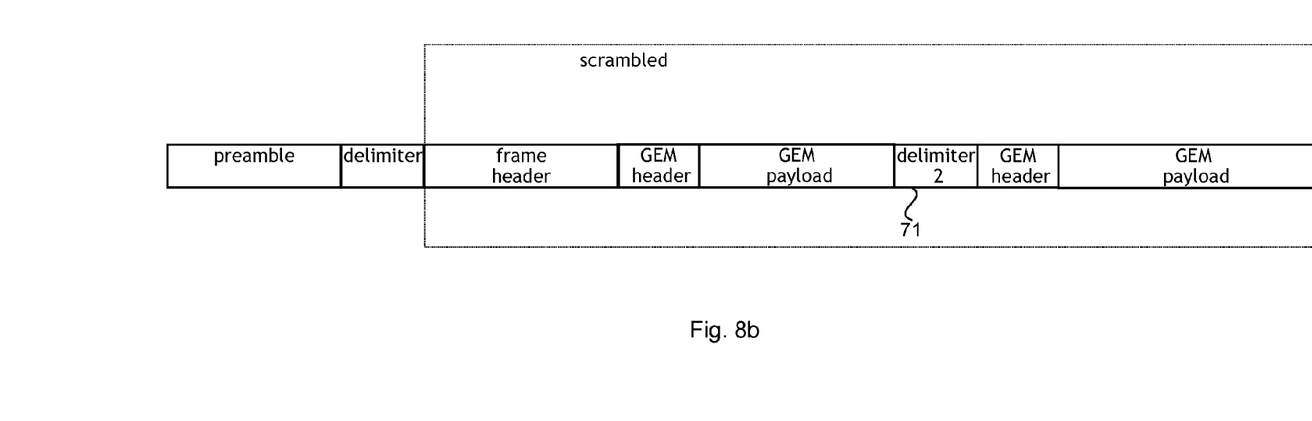
Figure 9:
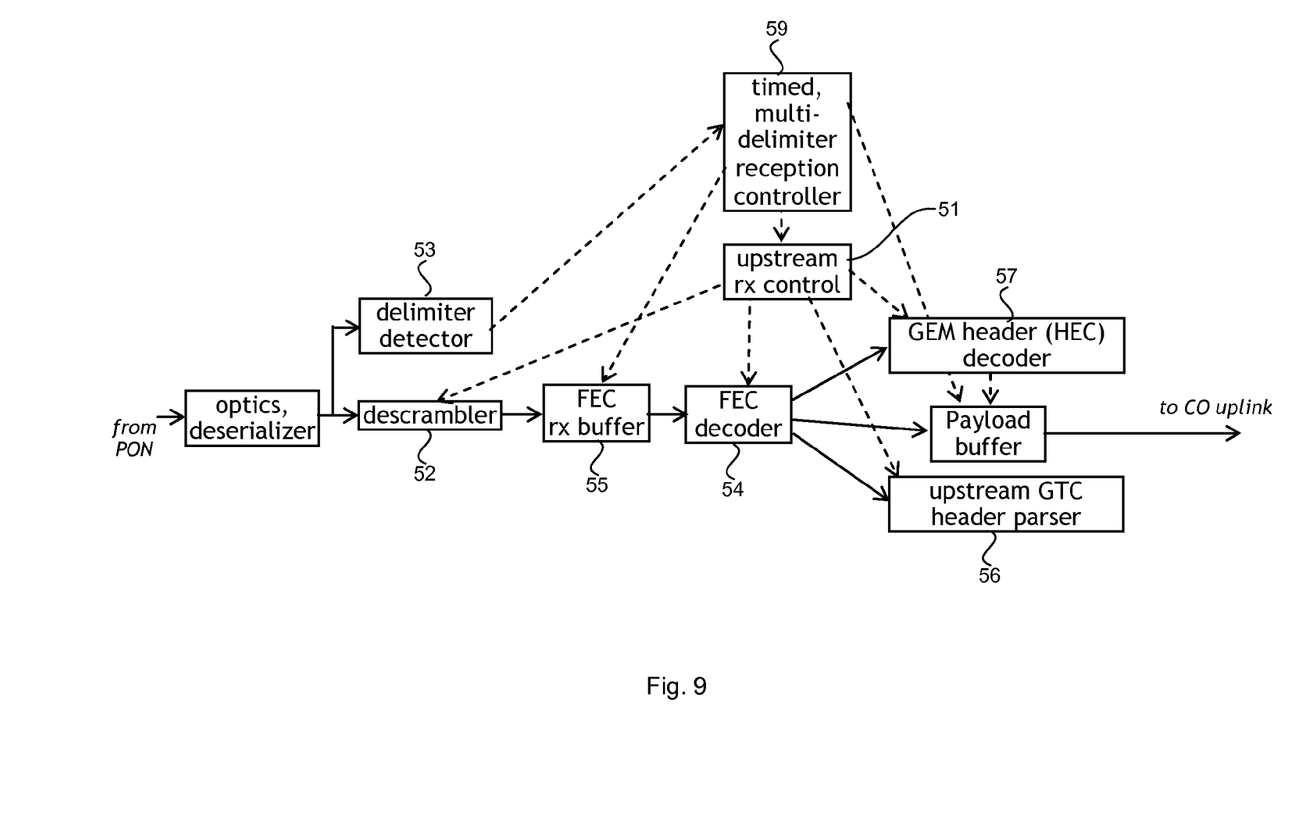
FIG. 9 illustrates a GPON OLT upstream path architecture for multi-delimiter reception.

Convention 2. If the upstream FEC is not used, the OLT shall start receiving the frame starting with the first byte following the detected delimiter. The ONU shall ensure that the first full GEM frame following this delimiter starts immediately after the delimiter. The GEM alignment specified by this convention is illustrated in FIG. 8a for insertion point A and FIG. 8b for all other insertion points.

Convention 3. When an OLT, that is already synchronized and receiving the upstream frame, receives an additional delimiter, it shall remove it from the data flow in a way that corresponds with the delimiter insertion method implemented in the ONU. Further, the OLT operation may be dynamically adjustable to properly handle upstream frames from different ONUs, using different delimiter insertion methods.

Whereas the implementation of OLT functionality per conventions 1 and 2 is straightforward and independent of the way the delimiter is inserted in the frame, the implementation of Convention 3 varies depending on the insertion type.

The frame structure and specific ONU and OLT operation associated with delimiter insertion at each insertion point of FIG. 6 will now be described.

Figure 7A:
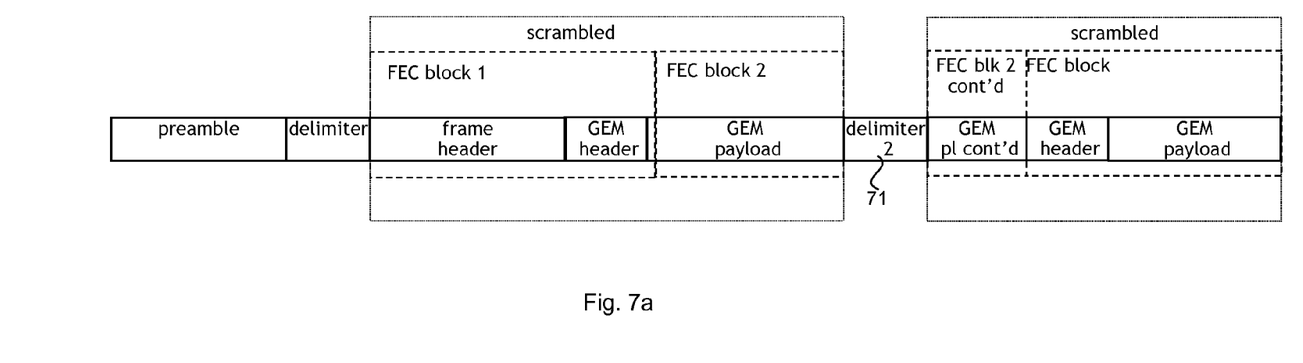
FIG. 7 illustrates a modified upstream frame structure with second delimiter and FEC.
Figure 7B:
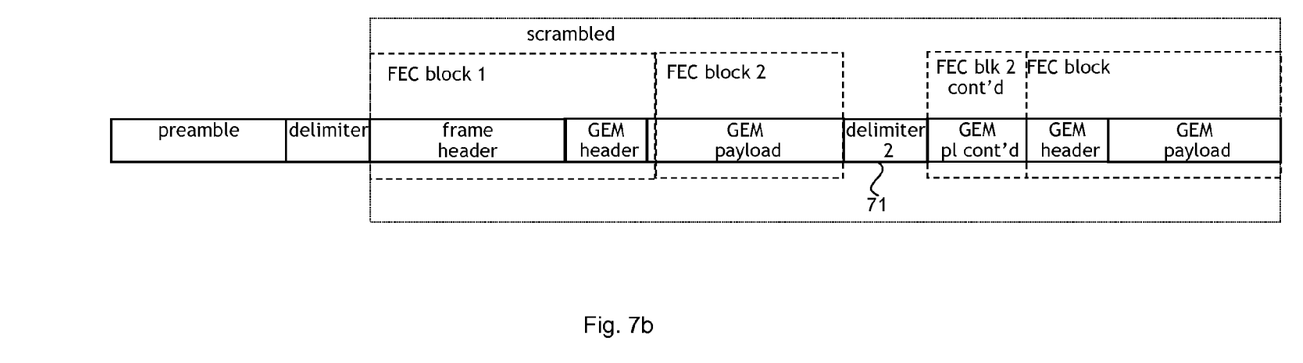
Figure 7C:
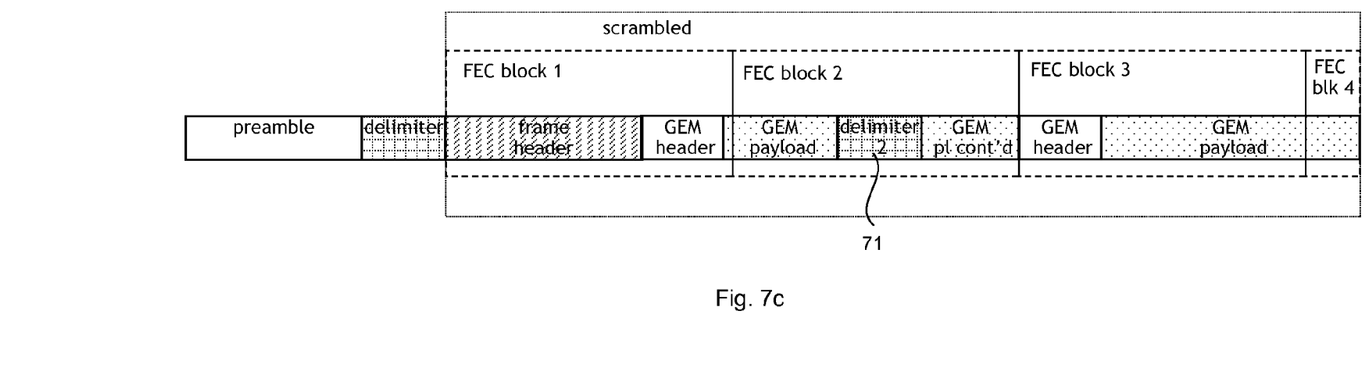
Figure 7D:
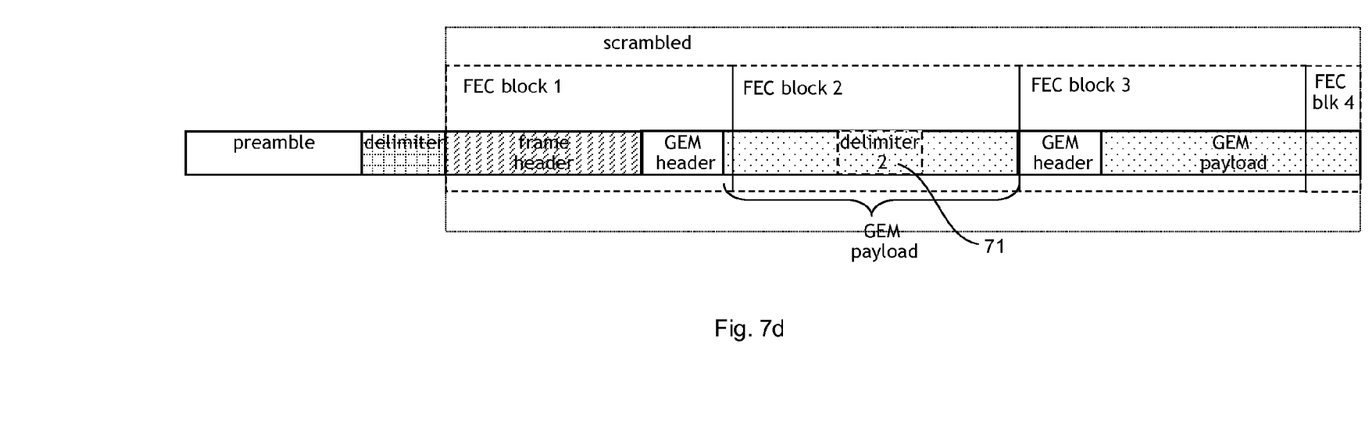
Figure 10:
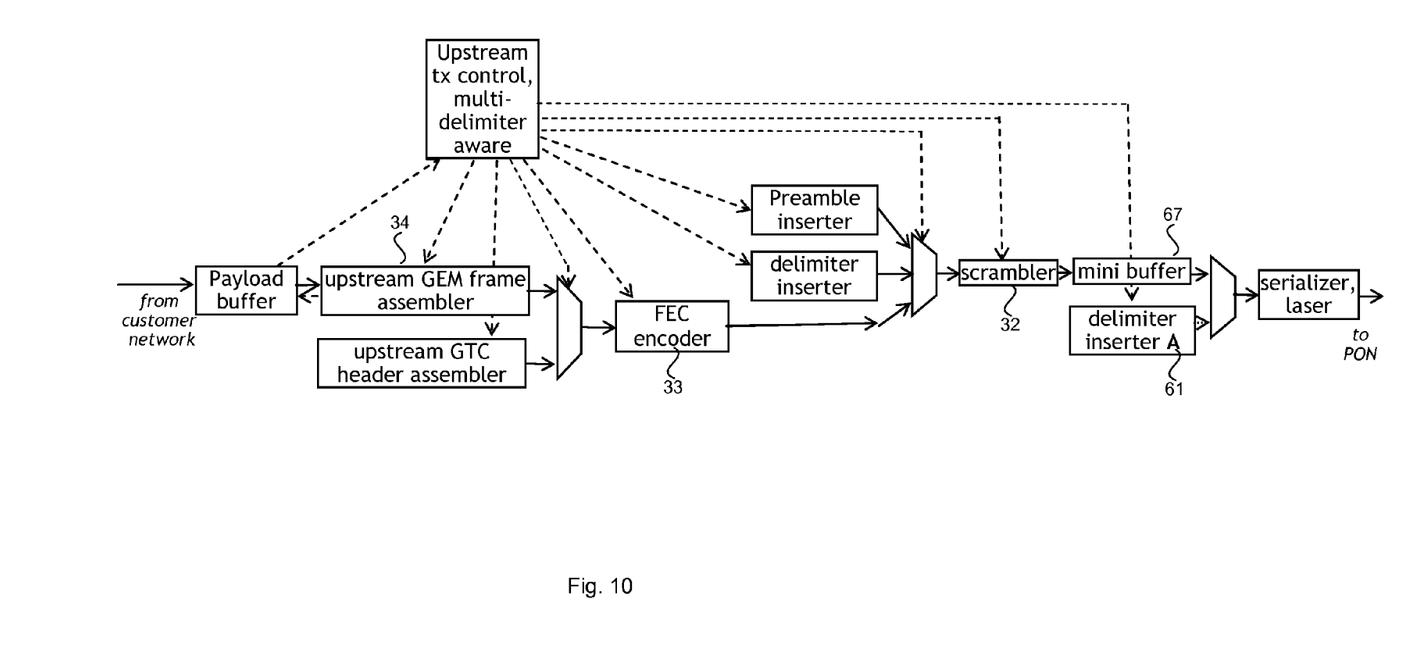
FIG. 10 illustrates a GPON ONU upstream path architecture (with multi-delimiter insertion at point A)

Insertion point A: As shown in FIG. 10, a delimiter inserted at this point 61 bypasses the ONU scrambler 32, FEC encoder 33 and GEM framer 34, implying that the additional delimiters 71 are transmitted unscrambled and outside of the FEC blocks and GEM frames, as shown in FIGS. 7a and 8a. Such delimiter insertion does not interfere with the operation of the ONU upstream pipeline, which is operating as if no insertion is taking place. During the transmission of the additional delimiter, the output of this pipeline is stored in a mini buffer 67, as also shown in FIG. 10. This way, the continuity of the scrambling pattern, FEC blocks and GEM frames is preserved. The corresponding frame structure is shown in FIGS. 7a and 8a for the cases when upstream FEC is used and not used, respectively.

If the OLT compatible with insertion at point A is already synchronized to a previously detected delimiter, its control logic shall:
  stop the descrambler for the duration of the reception of each additional delimiter, as determined by the multi-delimiter reception controller 59,
  disable writing of the delimiter in the receive buffer (FEC buffer when FEC is used or payload buffer when FEC is not used), and
  continue receiving the frame by writing all other received words in the receive buffer.

Figure 11:
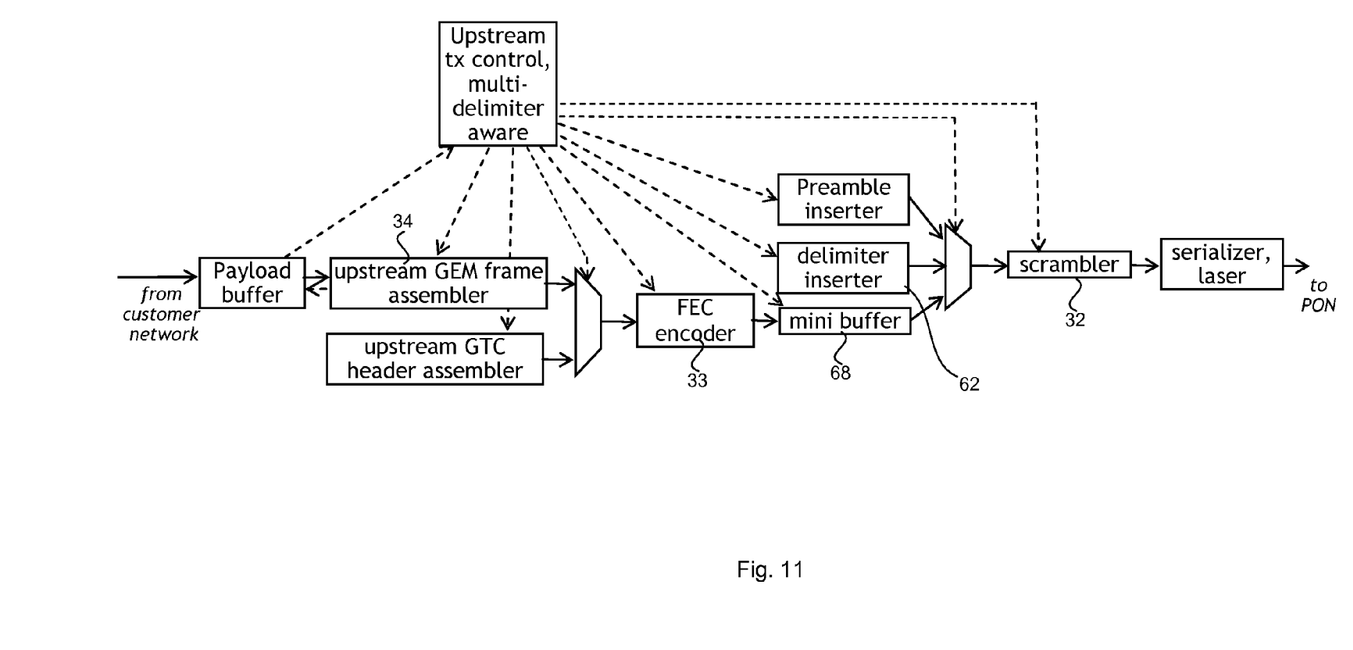
FIG. 11 illustrates a GPON ONU upstream path architecture (with multi-delimiter insertion at point B)

Insertion point B: As shown in FIG. 11, an additional delimiter inserted at point B 62 bypasses the FEC encoder 33 and GEM framer 34, but runs through the scrambler 32. If the inserted delimiter is to be scrambled, it is necessary for the ONU to insert the value which, when scrambled using the scrambling pattern for its corresponding position in the frame, results in a bit sequence identical to the delimiter. This way, the delimiter to be detected at the OLT will always be the same regardless of its position in the frame. During the transmission of the additional delimiter, the output of the ONU GEM-FEC pipeline is stored in a mini buffer 68, as also shown in FIG. 11.

If the OLT compatible with delimiter insertion at point B is already synchronized to a previously detected delimiter its control logic shall:
  keep the descrambler running,
  disable writing of the delimiter in the receive buffer (FEC buffer when FEC is used or payload buffer when FEC is not used), and
  continue receiving the frame by writing all other received words in the receive buffer.

Figure 12:
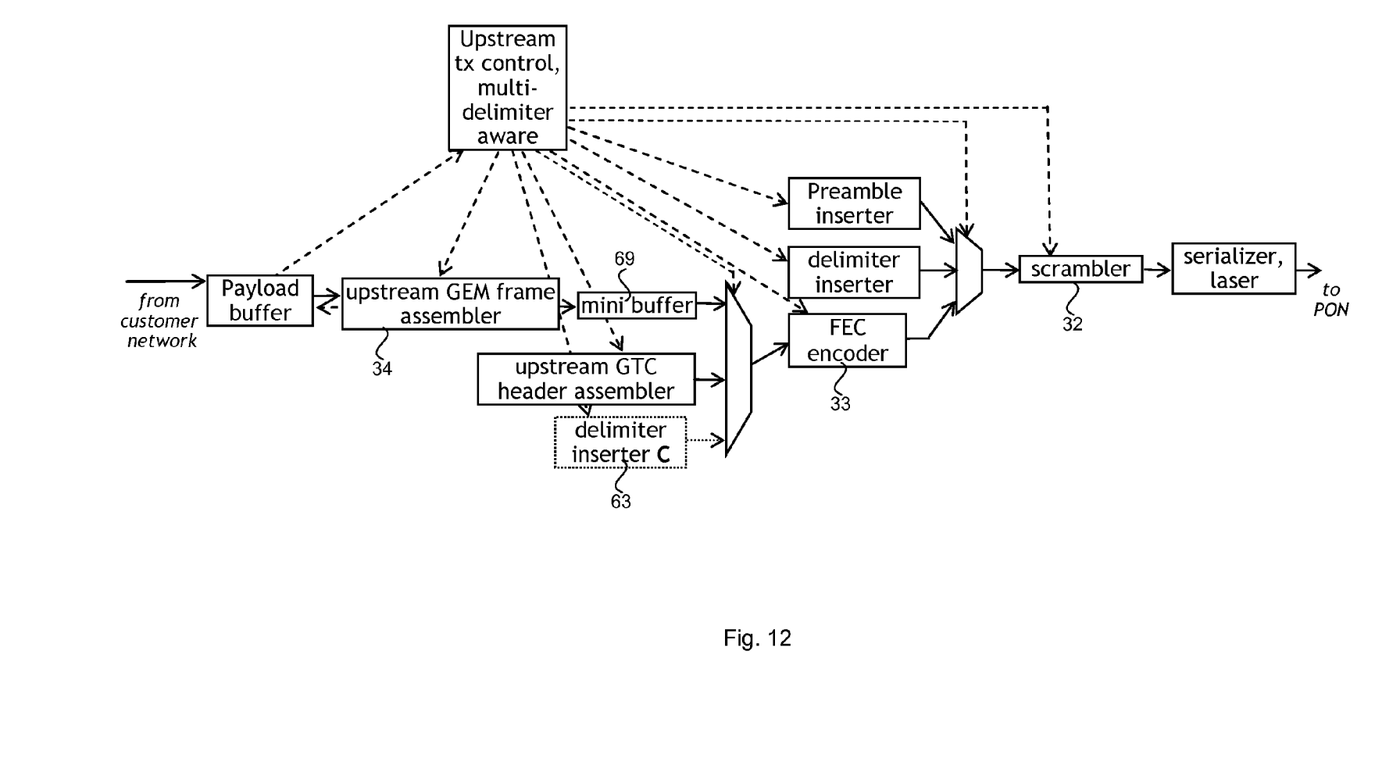
FIG. 12 illustrates a GPON ONU upstream path architecture (with multi-delimiter insertion at point C)

Insertion point C: Delimiter inserted at point C 63 bypasses the GEM framer 34. However, it does get scrambled by scrambler 32 and should be specified in the same way as the delimiter inserted at point B. In addition, the delimiter inserted at point C runs through the FEC encoder 33 and becomes part of the FEC codeword. FEC encoding does not change the delimiter in any way. Again, a mini buffer 69 is used to store the output of the GEM framer while an additional delimiter is being inserted.

If the OLT compatible with delimiter insertion at point C is already synchronized to a previously detected delimiter, its logic shall:
  keep the descrambler running,
  keep writing to the FEC RX buffer enabled,
  disable writing of the delimiter in the payload receive buffer, and
  continue receiving the frame by writing all received payload words to the payload receive buffer.

Insertion point D: Delimiter inserted at point D 64 runs through all building blocks of the ONU upstream datapath. Like the delimiter inserted at point C, it is scrambled and also used as part of the FEC block. Additionally, in this case the delimiter becomes part of the upstream GEM frame. This can be achieved in two ways: a) by inserting the delimiter between the payload data and adjusting the frame length indicator in the GEM header to reflect the frame length increased by the length of the delimiter or, b) by creating a separate GEM frame containing only the delimiter as the payload.

If the OLT compatible with delimiter insertion at point D is already synchronized to a previously detected delimiter, its logic shall:
  keep the descrambler running,
  keep writing to the FEC RX buffer enabled,
  disable writing of the delimiter in the payload receive buffer,
  continue receiving the frame by writing all received payload words to the payload receive buffer, and
  subtract the delimiter length from the value indicated in the GEM header.

Figure 13A:
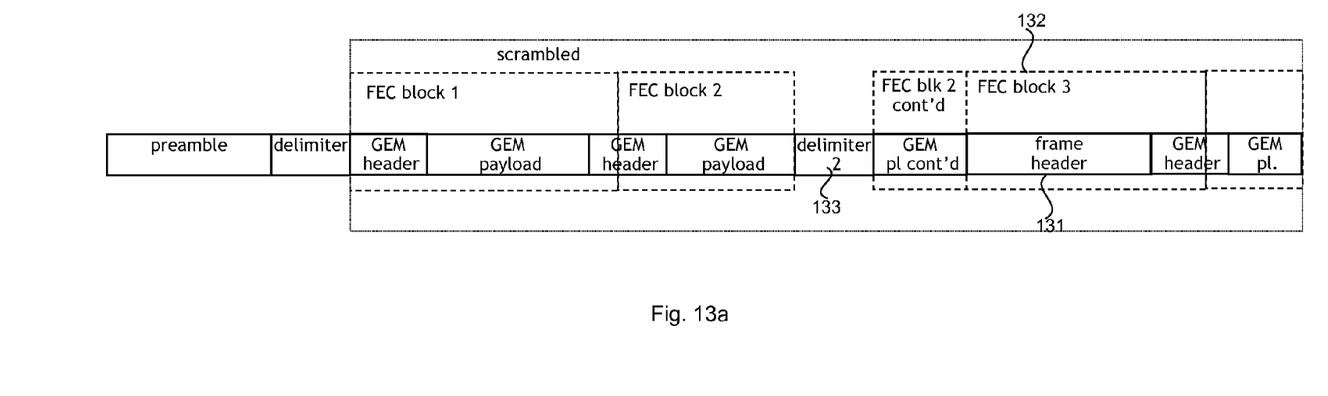
FIG. 13 illustrates a frame header sent after second delimiter.

Insertion of the GTC frame header in a location other than the beginning of the frame is illustrated in FIG. 13a, for the frame structure resulting from delimiter insertion at point B. In this case, the ONU starts transmitting the frame header 131 at the beginning of the first full FEC block 132 following the second delimiter 133.

Figure 13B:
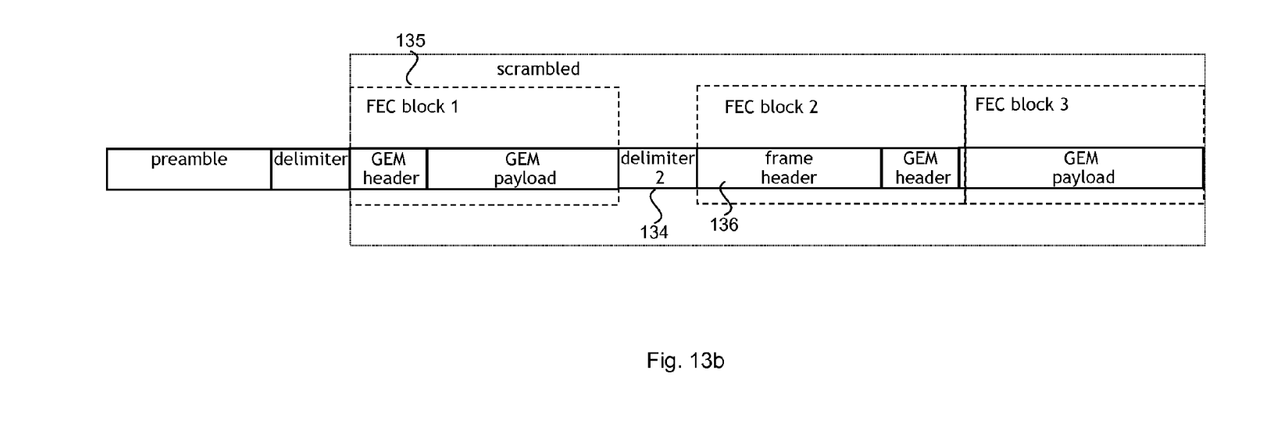

It is clear that the position in the frame chosen for delimiter insertion can vary the frame structure to some extent. For example, as shown in FIG. 13b, if the second delimiter 134 is added at the insertion point B immediately after the completion of a full FEC block 135, if a frame header 136 is specified to follow this delimiter, it will be transmitted immediately after the delimiter, in the same manner as in the original GPON upstream frame, where the header immediately follows the initial delimiter.

The embodiments described herein enable significant reduction in packet loss due to failed delimiter detection, enabling partial frame reception in cases when delimiter detection failure does take place. This is achieved by insertion of a programmable number of delimiters, at programmable locations in the upstream frame. The delimiter insertion scheme can be customized for each ONU so that each ONU can be programmed individually to perform delimiter insertion appropriate for the quality of the signal it is transmitting. The embodiments encompass the method for synchronization of the upstream receiver of the PON OLT, which is applicable to the ITU-T family of PON standards (GPON, XGPON), as well as on 10G EPON by IEEE. Further, the embodiments increase the reliability of reception of critical information delivered in the upstream frame, typically delivered as part of its header, by relocating the header to a specified part of the frame.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. An optical line termination device of a passive optical network configured to:
   receive a frame from at least one optical network unit;
   process the frame to detect a first delimiter in the frame;
   process the frame to detect at least one second delimiter in the frame; and
   communicate a delimiter scheme to the at least one optical network unit, where the delimiter scheme indicates at least one of a number of second delimiters, a frame location of one or more of the at least one second delimiters, and a bit pattern of the one or more second delimiters.

2. The optical line termination according to claim 1 comprising:
   a delimiter detector module; and
   a receiver control unit configured to activate the delimiter detector module at the beginning of a time window for delimiter detection of the first delimiter and at the beginning of a time window for detection of the at least one second delimiter.

3. The optical line termination device according to claim 1 configured to indicate to the at least one optical network unit an offset from the beginning of the frame at which to send an upstream frame header.

4. The optical line termination device according to claim 1 comprising:
   a receive buffer;
   a delimiter reception controller configured to determine when multiple delimiters have been detected within a frame; and
   an upstream receiver controller configured to disable writing into the receive buffer of each additional delimiter received after an initial detection of a delimiter in the frame.

5. The optical line termination device according to claim 4 comprising a descrambler, wherein the upstream receiver controller is configured to stop the descrambler for the duration of the reception of each additional delimiter after initial detection of an initial delimiter in the frame.

6. The optical line termination device according to claim 1 comprising:
   a payload receive buffer;
   a delimiter reception controller configured to determine when multiple delimiters have been detected within a frame; and
   an upstream receiver controller configured to disable writing into the payload receive buffer of each additional delimiter received after an initial detection of one or more of the first delimiter in the frame and the at least one second delimiter in the frame.

7. The optical line termination device according to claim 1 configured to subtract the length of the at least one second delimiter from a length value indicated in a gigabit passive optical network (GPON) encapsulation method (GEM) header.

8. An apparatus, comprising:
   An optical line termination that receives a frame and processes the frame to detect a first delimiter in the frame at least one second delimiter in the frame, and wherein the optical line termination device is also configured to communicate a delimiter scheme to the at least one optical network unit, wherein the delimiter scheme indicates at least one of a number of second delimiters, a frame location of one or more of the at least one second delimiter, and a bit pattern of the at least one second delimiter.

* * * * *